July 13, 1937. T. LIGGETT, 3D 2,087,156
GAS ABSORPTION TOWER
Filed Feb. 15, 1937

Thomas Liggett 3rd INVENTOR
BY Victor J. Evans & Co.
ATTORNEYS

Patented July 13, 1937

2,087,156

UNITED STATES PATENT OFFICE 2,087,156

GAS ABSORPTION TOWER

Thomas Liggett, 3d, Jenkintown, Pa.

Application February 15, 1937, Serial No. 125,878

3 Claims. (Cl. 261—98)

This invention relates to gas absorption towers and has for an object to provide a tower in which both the absorption liquid, such as caustic solution, and the gas to be purified or absorbed, such as the carbon dioxide in air, are mixed and caused to flow through the tower by the action of one or the other through a jet. Thus some auxiliary pumps or fans may be eliminated and more efficient operation obtained, especially under extremely high pressures, than hitherto possible.

Another object is to provide flow and counterflow of gas to be absorbed so as to further increase the efficiency of absorption towers.

Still another object is to provide a gas absorption tower in which thorough mixing of the gas and absorption liquid is accomplished either under high pressures or low pressures to even further increase the efficiency of absorption towers.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1:
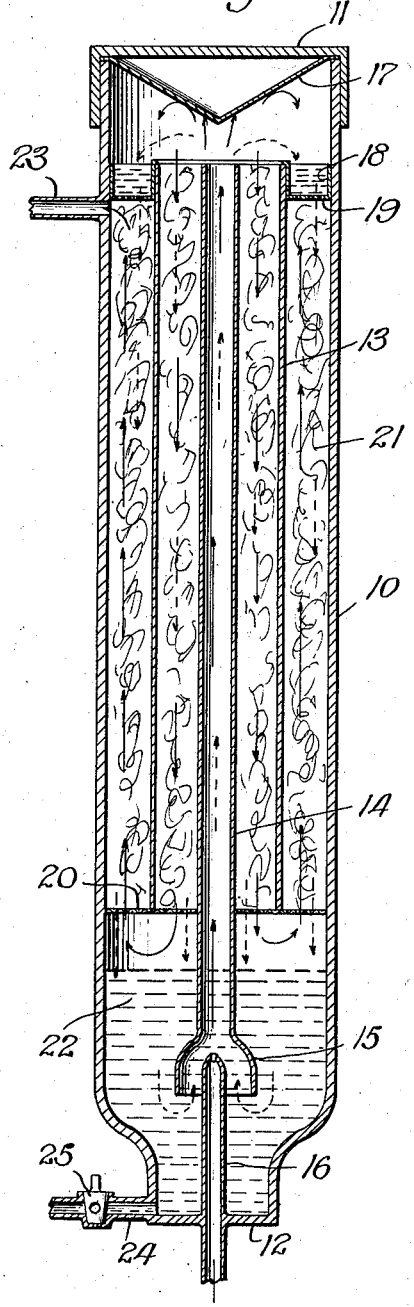
Figure 1 is a longitudinal sectional view through a gas absorption tower for high pressures constructed in accordance with the invention.

Referring now to the drawing in which like characters of reference designate similar parts in the various views, 10 designates the outer casing of the tower, the same being sealed at the top and the bottom respectively by closures 11 and 12. An inner open ended sleeve 13 is concentrically disposed in the outer casing 10 and is of shorter length than the latter. An intake pipe 14 is mounted axially in the sleeve and extends below the bottom of the latter where the pipe is enlarged as shown at 15 to receive a jet nozzle 16 which enters the tower through the bottom closure 12.

A conical baffle 17 is disposed in the top of the tower. Below the baffle, and surrounding the upper end of the sleeve 13, an annular pan 18 for catching absorption liquid is located. The pan is provided in the bottom with minute perforations 19 which permit escape of the contents downwardly in counterflow to the gas as will be presently described.

A screen 20 is mounted in the outer casing 10 at the bottom of the sleeve 13. Conventional packing material 21 is disposed between the screen 20 and the pan 18 in both of the contact spaces outside of the sleeve 13 and inside the sleeve 13 around the intake pipe 14.

The absorption liquid 22, such as caustic solution, fills the bottom of the outer casing 10 and rises above the enlarged intake end 15 of the intake pipe 14 so that the gas to be absorbed such as carbon dioxide in air entering the jet nozzle 16 will be thoroughly mixed with the liquid. The gas and liquid in spray form will be carried upwardly in the intake pipe 14, as indicated by the arrows, the full line arrows indicating the path of the gas and the dotted arrows indicating the path of the liquid. The mixture strikes against the baffle 17 at the top of the tower and is distributed uniformly over the top of the tower. All of the gas and part of the liquid descends through the sleeve 13 and the remainder of the liquid collects in the pan 18, and is distributed between the sleeve 13 and outer cylinder 10 through the openings in the bottom of the pan.

The liquid collects in the bottom of the tower after traveling through the packed sleeve and outer cylinder. The gas, however, after descending through the sleeve 13 rises through the space between the sleeve and the outer cylinder, and the remaining unabsorbed gas, such as purified air, emerges from the outer cylinder near the top thereof through an outlet pipe 23.

A drain pipe 24 is connected with the bottom of the tower and is provided with an outlet valve 25 for draining the absorption liquid after it is spent.

Figure 2:
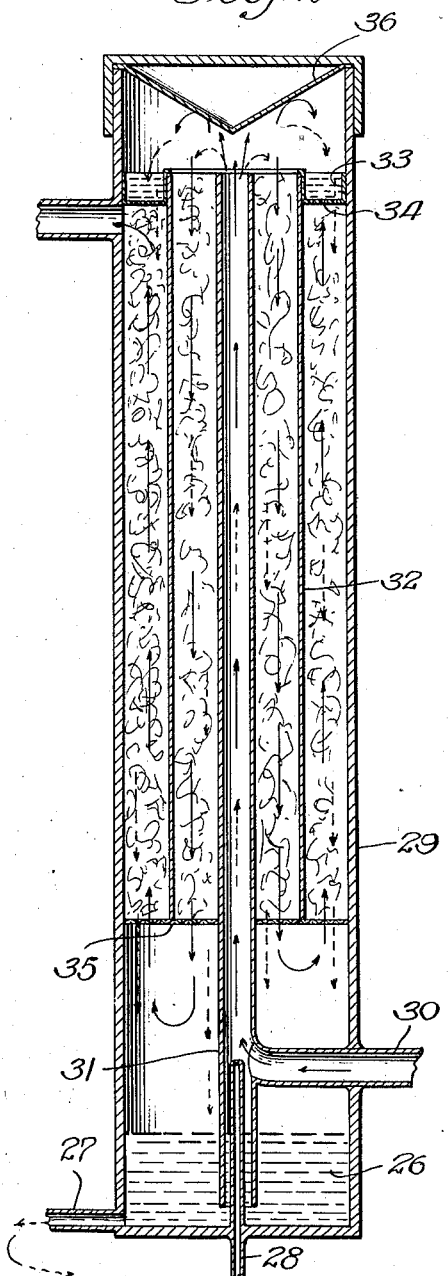
Figure 2 is a longitudinal sectional view through a modified form of the gas absorption tower suitable for use in connection with lower pressures.

In the modified form of the invention shown in Figure 2 the absorption liquid itself causes the circulation in the tower. To this end the liquid 26 is taken from the bottom of the tower through an outlet pipe 27 and returns under pressure through a jet nozzle 28. The gas to be purified, such as air containing carbon dioxide, enters the bottom of the outer cylinder 29 through a supply pipe 30 which is connected to the axial intake pipe 31 near the tip of the jet nozzle. Also it will be pointed out that the intake pipe extends downwardly below the liquid level and serves as a drain for that small portion of the liquid which collects on the walls and trickles back.

The remainder of the construction is similar to the construction already illustrated in Figure 1 and previously described in that a sleeve 32 is disposed concentrically in the outer cylinder 29 and an annular pan forming a reservoir 33 is mounted in the space between the sleeve and the outer cylinder at the top of the inner cylinder, the pan having a perforated bottom 34. A screen member 35 is disposed in the outer cylinder at the bottom of the sleeve and a conical baffle 36 is disposed in the top of the outer cylinder.

In the low pressure tower shown in Figure 2, the absorption liquid will circulate the gas as indicated by the arrows and thus eliminate pressure drop in the gas through the tower so that the use of auxiliary fans or blowers may be dispensed with.

It will be noted that the parallel flow through the packed sleeve in relation to the counter-current flow through the packed space between the sleeve and the outer cylinder and the thorough mixing of gas and absorption liquid in the intake pipe will promote high efficiency in the removal of the carbon dioxide or other gas to be absorbed.

From the above description it is thought that the construction and operation of the invention will be fully understood without further explanation.

What is claimed is:

1. A gas absorption tower having a vertical intake pipe through which gas and absorption liquid may be mixed, a jet nozzle in the pipe for forcing the mixture up the intake pipe by the action of the gas or the liquid, an inner open ended sleeve and an outer casing concentric with said pipe, the spaces between said pipe, sleeve and casing providing contact spaces, an annular pan for catching absorption liquid positioned between said sleeve and casing near the upper ends thereof, said pan having a perforated bottom, an outlet for purified gas extending through the casing just beneath said pan, the arrangement being such that the mixture flows downwardly through the sleeve and upwardly through the annular space between the casing and sleeve, and the liquid caught in said pan flows downwardly in said space in countercurrent to said gas.

2. A gas absorption tower comprising an outer casing, an inner open ended sleeve, a vertical intake pipe mounted axially in the sleeve and extending below the bottom of the latter, a jet nozzle entering the bottom of the intake pipe for supplying either the gas to be purified or the purifying liquid thereto, packing material between the outer casing and the sleeve and between the sleeve and the intake pipe, a conical baffle in the top of the outer casing, the bottom of the outer casing forming a tank for absorption liquid, an annular pan for catching absorption liquid disposed between the outer casing and the sleeve below the baffle and perforated to permit absorption liquid to escape downwardly between the outer casing and the sleeve, and an outlet pipe for purified gas extending through the outer casing below the pan, the flow of gas and absorption liquid being in an upward direction through the intake pipe and downward through the inner sleeve, and the purified gas flowing upward through the outer casing.

3. A gas absorption tower comprising an outer vertical casing, an inner open ended sleeve concentric with the casing, an intake pipe disposed axially in the sleeve, a laterally disposed gas supply pipe connected with the intake pipe, the bottom of the outer casing forming a tank for absorption liquid, means for withdrawing the absorbent from the tank and injecting the same under pressure into the intake pipe at a point below the end of the gas supply pipe, a conical baffle in the top of the outer casing, a pan for catching absorption liquid disposed between the outer casing and the sleeve near the top of the sleeve and perforated in the bottom, packing material between the outer sleeve and the inner casing and between the inner sleeve and the intake pipe, and an outlet pipe for purified gas extending through the outer casing below the pan, the flow of the mixture of gas and absorption liquid being downwardly through the sleeve and upwardly through the outer casing, and the liquid caught in the pan flowing downwardly countercurrent to said gas.

THOMAS LIGGETT, 3D.